(12) United States Patent
Marinescu

(10) Patent No.: US 12,118,441 B2
(45) Date of Patent: Oct. 15, 2024

(54) KNOWLEDGE AUGMENTED SEQUENTIAL DECISION-MAKING UNDER UNCERTAINTY

(71) Applicant: International Business Machines Corporation, Armonk, NY (US)

(72) Inventor: Radu Marinescu, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 325 days.

(21) Appl. No.: 17/548,672

(22) Filed: Dec. 13, 2021

(65) Prior Publication Data
US 2023/0186145 A1 Jun. 15, 2023

(51) Int. Cl.
G06N 20/00 (2019.01)
G06F 40/40 (2020.01)
G06N 7/00 (2023.01)

(52) U.S. Cl.
CPC ............ *G06N 20/00* (2019.01); *G06F 40/40* (2020.01); *G06N 7/00* (2013.01)

(58) Field of Classification Search
CPC .......... G06N 20/00; G06N 7/00; G06N 10/40; G06F 40/40; G06F 40/279
See application file for complete search history.

(56) References Cited

U.S. PATENT DOCUMENTS 7,644,053 B2 1/2010 Kipersztok et al.
8,140,523 B2 3/2012 Fakhouri et al.
8,271,936 B2 9/2012 Ciofi
(Continued)

FOREIGN PATENT DOCUMENTS

CN 111124666 A 5/2020
CN 108680155 B 9/2020

OTHER PUBLICATIONS

Le et al., "Batch policy learning under constraints." In International Conference on Machine Learning, pp. 3703-3712. PMLR, 2019.
(Continued)

*Primary Examiner* — Daniel C Washburn
*Assistant Examiner* — Athar N Pasha
(74) *Attorney, Agent, or Firm* — Amin, Turocy & Watson, LLP

(57) ABSTRACT

One or more systems, devices, computer program products and/or computer-implemented methods of use provided herein relate to outputting an optimal decision policy base on informal knowledge input. A system can comprise a memory that stores computer executable components, and a processor that executes the computer executable components stored in the memory, wherein the computer executable components can comprise an analysis component that analyzes an input dataset comprising a constraint in a natural language form, and an augmentation component that generates an influence mapping comprising a constraint variable based on the constraint input. In an embodiment, an input dataset employed to support the influence mapping can comprise time-stamped tuple data comprising a state, an action and a reward. In an embodiment, an inference engine can generate an output policy in response to the constraint input and which output policy can be based on the constraint input and constraint variable.

20 Claims, 10 Drawing Sheets

(56) References Cited

U.S. PATENT DOCUMENTS

| | | | | |
|---|---|---|---|---|
| 8,874,456 | B2* | 10/2014 | Lakritz | G06Q 10/06 705/7.14 |
| 10,250,641 | B2 | 4/2019 | Porras et al. | |
| 10,902,349 | B2 | 1/2021 | Ghosh et al. | |
| 10,963,819 | B1* | 3/2021 | Gangadharaiah | G06N 3/044 |
| 2009/0037926 | A1* | 2/2009 | Dinda | G06F 9/4887 718/107 |
| 2018/0197149 | A1* | 7/2018 | Wang | G06Q 10/06 |
| 2018/0226076 | A1* | 8/2018 | Kotti | G10L 15/22 |
| 2019/0034843 | A1* | 1/2019 | Mehrotra | G06Q 10/0631 |
| 2020/0134505 | A1* | 4/2020 | Jang | B25J 9/163 |
| 2021/0117853 | A1 | 4/2021 | Lynch et al. | |
| 2021/0256377 | A1 | 9/2021 | Dalli et al. | |
| 2021/0303704 | A1* | 9/2021 | Chen | G06N 5/01 |

OTHER PUBLICATIONS

Mell et al., "The NIST Definition of Cloud Computing," Recommendations of the National Institute of Standards and Technology, NIST Special Publication 800-145, Sep. 2011, 7 pages.

Wu et al. "Developing a hybrid approach to extract constraints related information for constraint management." Automation in Construction 124 (2021): 103563.

Mao et al. "Extract, Denoise, and Enforce: Evaluating and Predicting Lexical Constraints for Conditional Text Generation." arXiv preprint arXiv:2104.08724 (2021).

Iijima "Automatic model building and solving for optimization problems." Decision Support Systems 18.3-4 (1996): 293-300.

Liu et al. "Ambience: Automatic model building using inference." Congress MSR03. 2003.

Lin et al. "Mathematical formula identification in PDF documents." 2011 international conference on document analysis and recognition. IEEE, 2011.

Baker et al., "A linear grammar approach to mathematical formula recognition from PDF." International Conference on Intelligent Computer Mathematics. Springer, Berlin, Heidelberg, 2009.

Analytica: Visionary modeling. Web accessed Dec. 3, 2021 https://lumina.com.

Syncopation Software, Syncopation Software: Publishers of the DPL & DPMX Solutions. Web accessed Dec. 3, 2021 https://www.syncopation.com.

Sanner, "Relational Dynamic Influence Diagram Language (RDDL): Language Description" Jan. 2011 (23 pages).

\* cited by examiner

KNOWLEDGE AUGMENTED SEQUENTIAL DECISION-MAKING UNDER UNCERTAINTY

BACKGROUND

In the field of artificial intelligent computer systems, machine learning (ML), a subset of artificial intelligence (AI), can employ algorithms to learn from data and create predictions based on this data. AI can learn from a data set to solve problems and to provide relevant recommendations. In some cases, AI can use self-teaching algorithms that use data minimum, visual recognition and/or natural language processing (NLP) to solve problems and to optimize processes.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. One or more embodiments described herein can be employed to address one or more deficiencies in existing optimization models (e.g., ML models). In one or more embodiments described herein, systems, computer-implemented methods, apparatuses and/or computer program products can facilitate a process to generate a decision policy for a dynamic problem based on a constraint provided in a natural language form. For example, one or more embodiments described herein can be employed to augment an optimization model for a dynamic problem based on a change to the problem that is input to a system in a natural language form. This can facilitate favorable predictions based on additional data provided in an informal manner (e.g., in a natural language form).

In accordance with an embodiment, a system can comprise a memory that stores computer executable components, and a processor that executes the computer executable components stored in the memory, wherein the computer executable components can comprise an analysis component that analyzes a desired constraint input in a natural language form, and an augmentation component that generates an influence mapping comprising a constraint variable based on the constraint.

In accordance with another embodiment, a computer-implemented method can comprise analyzing, by a system operatively coupled to a processor, a desired constraint input in a natural language form, and generating, by the system, an influence mapping comprising a constraint variable based on the constraint.

In accordance with yet another embodiment, a computer program product facilitating a process to generate a decision policy can comprise a computer readable storage medium having program instructions embodied therewith, the program instructions executable by a processor to cause the processor to analyze, by the processor, a desired constraint input in a natural language form, and to generate, by the processor, an influence mapping comprising a constraint variable based on the constraint.

DETAILED DESCRIPTION

Figure 1:
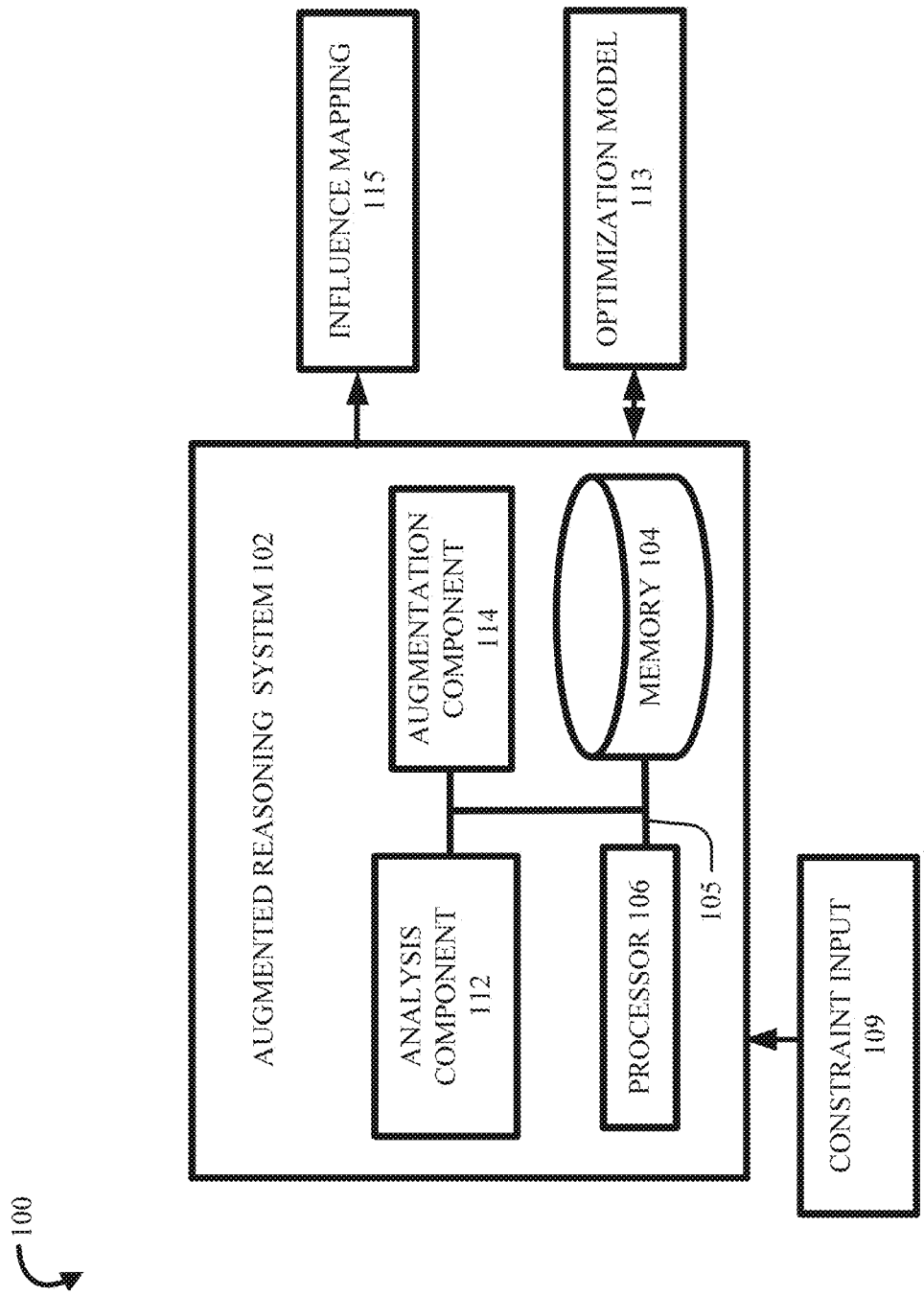
FIG. 1 illustrates a block diagram of an example, non-limiting system that can facilitate a process to generate a decision policy based on data provided to an ML model in a natural language form, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

ML models can be employed to solve static and/or dynamic sequential decision-making problems. These problems can be employed in many fields such as manufacturing, construction, formulation and/or design, such as for ordering, input/output and/or materials gathering processes. Optimization models (e.g., ML models) for such problems can take undesired time and/or processing power to design, generate, implement and/or train. Further, changes in the dynamic problem can result in desire to redesign, change, amend and/or otherwise augment an already-functioning optimization model. This augmentation can cause delays and/or full stoppage in a field, such as while a respective optimization model is re-designed, re-generated and/or re-trained.

Described herein are one or more embodiments of a system, computer-implemented method and/or computer program product that can account for one or more deficiencies of existing techniques for optimization model (e.g., an ML model) generation and/or augmentation. Generally, provided are one or more embodiments of a system, computer-implemented method and/or computer program product that can facilitate a process to generate a decision policy based on informal data input, such as being provided in a natural language form. That is, analysis of the constraint can employ natural language processing (NLP) to translate the constraint to a mathematical form. This formal form of the constraint can be employed by an inference engine to augment an optimization model and to output an output policy in accordance with the desired constraint. Training of the optimization model can be facilitated after each iteration to continually improve upon natural language text to corresponding formal constraint conversion.

One or more embodiments are now described with reference to the drawings, where like referenced numerals are used to refer to like elements throughout. As used herein, the terms "entity", "requesting entity" and "user entity" can refer to a machine, device, component, hardware, software, smart device and/or human. In the following description, for purposes of explanation, numerous specific details are set forth in order to provide a more thorough understanding of the one or more embodiments. It is evident, however, in various cases, that the one or more embodiments can be practiced without these specific details.

Figure 2:
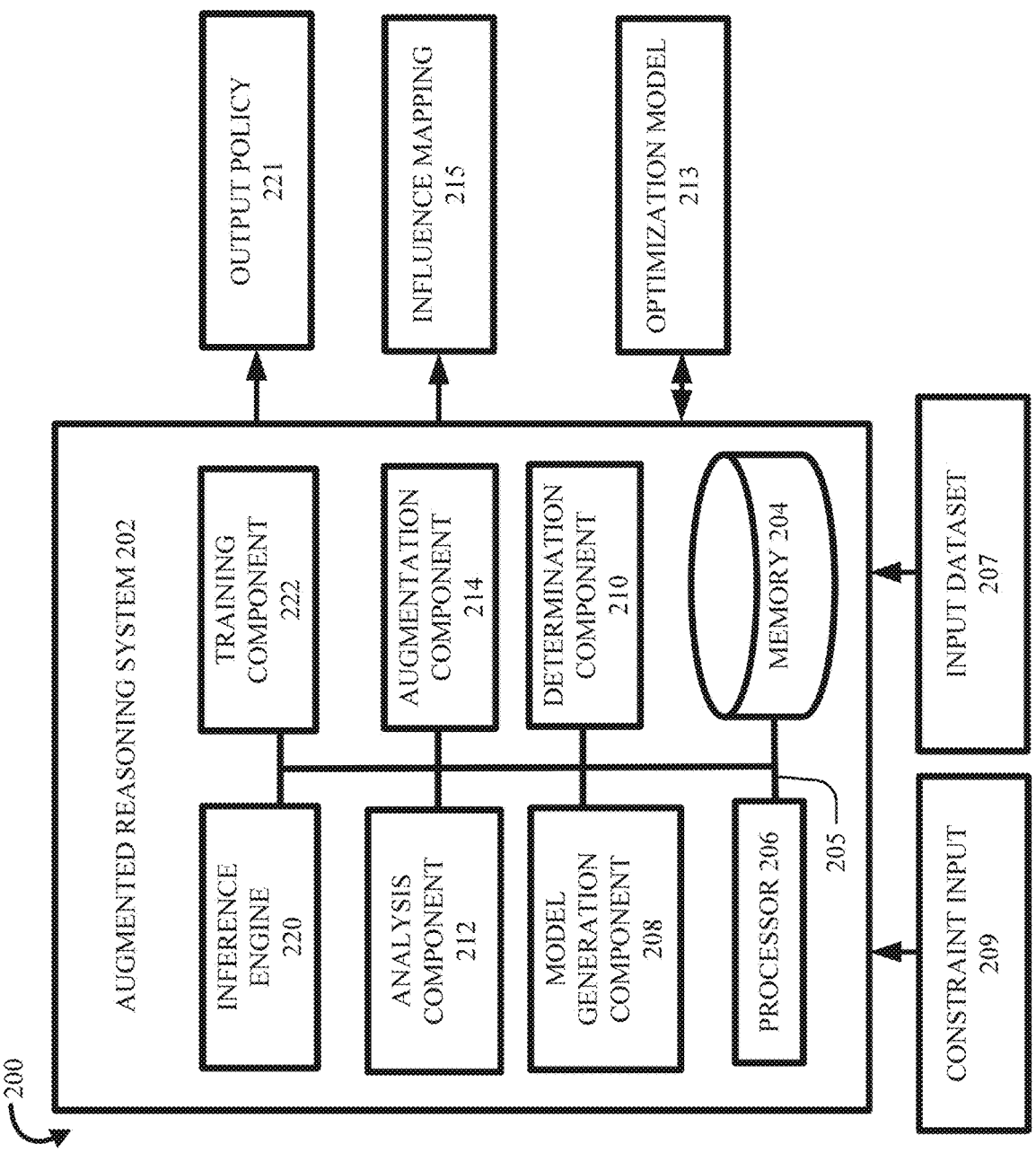
FIG. 2 illustrates a block diagram of another example, non-limiting system that can facilitate a process to generate a decision policy based on data provided to an ML model in a natural language form, in accordance with one or more embodiments described herein.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100 and/or 200 as illustrated at FIGS. 1 and 2, and/or systems thereof, can further comprise, be associated with and/or be coupled to one or more computer and/or computing-based elements described herein with reference to an operating environment, such as the operating environment 800 illustrated at FIG. 8. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning first generally to FIG. 1, one or more embodiments described herein can include one or more devices, systems and/or apparatuses that can facilitate optimization model augmentation and/or decision policy generation. For example, FIG. 1 illustrates a block diagram of an example, non-limiting system 100 that can employ NLP to enable informal input of additional data to an optimization model to achieve an output constraint variable.

At FIG. 1, illustrated is a block diagram of an example, non-limiting system 100 that can facilitate a process for augmenting an optimization model and/or for generating a decision policy, in accordance with one or more embodiments described herein. While referring here to one or more processes, facilitations and/or uses of the non-limiting system 100, description provided herein, both above and below, also can be relevant to one or more other non-limiting systems described herein, such as the non-limiting system 200, to be described below in detail.

As illustrated at FIG. 1, the non-limiting system 100 can comprise an augmented reasoning system 102. Augmented reasoning system 102 can comprise one or more components, such as a memory 104, processor 106, bus 105, analysis component 112 and/or augmentation component 114. Generally, augmented reasoning system 102 can facilitate augmentation of an optimization model 113 based on a constraint input 109 and by employing an influence mapping 115 also based on the constraint input 109. The optimization model 113 can be a machine learning (ML) such as an active learning model, deep learning (DL) model and/or the like.

To augment an optimization model 113 due to changing input data, the analysis component 112 can analyze a desired constraint input, such as the constraint input 109. The constraint input 109 can be provided in an informal form, such as a natural language form by a requesting entity. Generally, the analysis component can convert the desired constraint by employing NLP to provide a formal form of the constraint.

The augmentation component 114 can, based on the formal form, generate an influence mapping 115 comprising a constraint variable based on the constraint input 109. The constraint variable can be a single variable, amended variable, augmented variable, mathematic formula and/or the like based on the formal form. The constraint variable generally represents a change to the optimization model 113. For example, a constraint variable can be a formula that mathematically represents increasing given demand on a particular day of the week. As a result, an output policy can be determined, such as to increase ordering on the particular day or ahead of the particular day, such as to account for the increasing given demand.

One or more aspects of a component (e.g., the analysis component 112 and/or the augmentation component 114) can be employed separately and/or in combination, such as employing one or more of a memory or a processor of a system that includes the component to thereby facilitate generation of the constraint variable and/or the influence mapping 115. That is, these components can employ the processor 106 and/or the memory 104. Additionally and/or alternatively, the processor 106 can execute one or more program instructions to cause the processor 106 to perform one or more operations by these components.

Turning next to FIG. 2, the figure illustrates a diagram of an example, non-limiting system 200 that can facilitate a process for determining an output policy based on additional information provided for an optimization model, where the additional information is provided in an informal manner, in accordance with one or more embodiments described herein. Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

As illustrated, the non-limiting system 200 can comprise an augmented reasoning system 202. Generally, the augmented reasoning system 202 can facilitate generating a dynamic and probabilistic decision-making model (e.g., optimization model) from an input dataset, automatically converting a natural language description of knowledge into one or more constraints (e.g., linear and/or nonlinear constraints), combining the knowledge and the probabilistic decision model into a mixed decision model (e.g., influence mapping), automatically unfolding the mixed decision (influence) model over a decision period, and/or computing an optimal policy that satisfies the one or more constraints.

The augmented reasoning system 202, as illustrated, can comprise any suitable type of component, machine, device, facility, apparatus and/or instrument that comprises a processor and/or can be capable of effective and/or operative communication with a wired and/or wireless network. All such embodiments are envisioned. For example, augmented reasoning system 202 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the augmented reasoning system 202 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The augmented reasoning system 202 can be associated with, such as accessible via, a cloud computing environment. For example, the augmented reasoning system 202 can be associated with a cloud computing environment 950 described below with reference to FIG. 9 and/or with one or more functional abstraction layers described below with reference to FIG. 10 (e.g., hardware and software layer 1060, virtualization layer 1070, management layer 1080 and/or workloads layer 1090).

Operation of the non-limiting system 200 and/or of the augmented reasoning system 202 is not limited to use of a single constraint input and/or to output of a single decision policy. Rather, operation of the non-limiting system 200 and/or of the augmented reasoning system 202 can be scalable. For example, the non-limiting system 200 and/or the augmented reasoning system 202 can facilitate use of a single or plural constraint inputs and/or output of a single or plural decision policies. Further, the non-limiting system 200 and/or the augmented reasoning system 202 can train more than one ML model (e.g., optimization model) based on a such single or plural constraint inputs and/or output of a single or plural decision policies.

The augmented reasoning system 202 can comprise a plurality of components. The components can include a memory 204, processor 206, bus 205, model generation component 208, determination component 210, analysis component 212, augmentation component 214, inference engine 220 and/or training component 222. Like the augmented reasoning system 102, the augmented reasoning system 202 can be operated to facilitate a process for augmenting an optimization model and/or for generating a decision policy.

One or more communications between one or more components of the non-limiting system 200, and/or between an external system, such as comprising and/or facilitating access to any one or more of a constraint input, input dataset 209 and/or optimization model 213, and the non-limiting system 200, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion now turns to the processor 206, memory 204 and bus 205 of the augmented reasoning system 202.

For example, in one or more embodiments, augmented reasoning system 202 can comprise a processor 206 (e.g., computer processing unit, microprocessor, classical processor, quantum processor and/or like processor). In one or more embodiments, a component associated with augmented reasoning system 202, as described herein with or without reference to the one or more figures of the one or more embodiments, can comprise one or more computer and/or machine readable, writable and/or executable components and/or instructions that can be executed by processor 206 to facilitate performance of one or more processes defined by such component(s) and/or instruction(s). In one or more embodiments, the processor 206 can comprise model generation component 208, determination component 210, analysis component 212, augmentation component 214, inference engine 220 and/or training component 222.

In one or more embodiments, the augmented reasoning system 202 can comprise a computer-readable memory 204 that can be operably connected to the processor 206. The memory 204 can store computer-executable instructions that, upon execution by the processor 206, can cause the processor 206 and/or one or more other components of the augmented reasoning system 202 (e.g., model generation component 208, determination component 210, analysis component 212, augmentation component 214, inference engine 220 and/or training component 222) to perform one or more actions. In one or more embodiments, the memory 204 can store computer-executable components (e.g., model generation component 208, determination component 210, analysis component 212, augmentation component 214, inference engine 220 and/or training component 222).

Augmented reasoning system 202 and/or a component thereof as described herein, can be communicatively, electrically, operatively, optically and/or otherwise coupled to one another via a bus 205 to perform functions of non-limiting system 200, augmented reasoning system 202 and/or one or more components thereof and/or coupled therewith. Bus 205 can comprise one or more of a memory bus, memory controller, peripheral bus, external bus, local bus, quantum bus and/or another type of bus that can employ one or more bus architectures. One or more of these examples of bus 205 can be employed to implement one or more embodiments described herein.

In one or more embodiments, augmented reasoning system 202 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network.

In one or more embodiments, one or more of the components of the non-limiting system 200 can reside in the cloud, and/or can reside locally in a local computing environment (e.g., at a specified location(s)).

In addition to the processor 206 and/or memory 204 described above, augmented reasoning system 202 can comprise one or more computer and/or machine readable, writable and/or executable components and/or instructions that, when executed by processor 206, can facilitate performance of one or more operations defined by such component(s) and/or instruction(s).

Turning now to the determination component 210, the determination component can receive, download, transfer, upload and/or otherwise obtain an input dataset 207, such as for generating an optimization model 213, and/or can obtain a constraint input 209 for updating and/or generating the optimization model. The constraint input 209 and/or input dataset 207 can be discoverable by and/or connected to the augmented reasoning system 202 by any suitable means. While FIG. 2 illustrates the constraint input 209 and input dataset 207 internal to the non-limiting system 200, the constraint input 209 and/or input dataset 207 can be stored internal and/or external to the non-limiting system 200 in one or more embodiments.

The input dataset 207 can comprise data in any suitable format, such as text, binary, tabular and/or the like. In one or more embodiments, a dataset can comprise timestamped data. In one or more embodiments an input dataset can comprise tabled tuple data comprise plural instances of state, action, reward and/or next state data. The input dataset 207 can comprise metadata. In one or more embodiments, metadata can comprise columns in the input dataset 207 that correspond to state variables, action variables and reward functions. In addition, the metadata can include the time horizon of the decision problem (e.g., 7 days, or 6 months, 2 years, etc.).

The model generation component 208 can employ the input dataset 207 as input to build (e.g., generate) an optimization model 213 (also herein referred to as a non-mixed influence model) for use in providing static and/or dynamic probabilistic predictions. In one or more embodiments, the model generation component 208 can employ a suitable algorithm to analyze the input dataset 207 and to generate the optimization model 213.

In one embodiment, a structure learning algorithm, such as a hill-climbing search algorithm, can be employed to learn a directed acyclic graph (DAG) over variables of the input data set 207 (e.g., state variables, action variables and/or reward variables. The search can be constrained relative to discreet portions of a time-stamped range of the dataset, such as employed time slices from t+1 to t. The search can be additionally and/or alternatively constrained such that reward variables can be sink nodes in a respective graph representing the optimization model (e.g., such that one or more of the reward variables do not have successors).

In an additional, alternative and/or same embodiment, a parameter learning algorithm, such as an expectation-maximization algorithm, can be employed to learn one or more parameters of the optimization model 213. The parameter learning algorithm can employ and/or generate one or more conditional probability tables corresponding to state variables of the input dataset 207, and/or can employ and/or generate reward functions corresponding to reward variables of the input dataset 207. The parameter learning algorithm can employ a transform, such as Cooper's transform, such as to convert reward variable values of the input dataset 207 into probabilities.

In one or more embodiments, the constraint input 209 can be employed to initially generate the optimization model 213 and/or can be employed after initial generation, such as in relation to one iteration of use of the optimization model 213.

The constraint input 209 can be provided in any suitable format, such as a natural language form. For example, an entity can indicate that "The sensor should report a temperature higher than 23 degrees Fahrenheit," or "Demand on Fridays is twice that on Mondays". Accordingly, rather than the user entity determining suitable formal language (e.g., in or relative to a formal language of the optimization model 213), more simple natural language text can be input. This can considerably reduce time for development of the optimization model 213 by a user entity, pushing such analysis to the augmented reasoning system 202.

Generally, the analysis component 212, can analyze the desired constraint input 209 having been input in a natural language form, such as employing an ontology algorithm or NLP algorithm. The analysis component further can mathematically formalize the constraint input 209 into a formal constraint form. For example, a set of formal constraints can describe a single sentence or phrase of a constraint input 209, such as in one of the forms: $x+2y<3$, or $A \lor \neg B \rightarrow C$, or $S(x) \lor P(x, y) \rightarrow R(x, y)$. For instance, x and y can be two real-valued variables that satisfy that inequality, A, B and C can be logical propositions (with values true or false) used in propositional logic, and $S(x)$, $P(x,y)$ and $R(x,y)$ can be logical predicates in first order logic.

In one or more embodiments, an NLP model employed can be a sequence-to-sequence neural network model that can predict a logical form ($L_i$) of each constraint input sentence ($S_i$).

In one or more embodiments, the analysis component and/or optimization model 213 can be trained on sets of NL text/formal form conversions.

In one or more embodiments, different methods of analysis can be employed for different types of constraints, such as inequalities, propositional logic formulae, and/or first-order logic formulae. In one or more embodiments, a same model can be employed for different types of constraints, such as inequalities and/or logical formulae in propositional and/or first-order logic.

In one or more embodiments, an ontology model employed can be leveraged to map and/or disambiguate variables of the input dataset 207 to various semantic concepts, such as converting 32 deg. F. to 32 deg. C.

Any of the one or more operations, steps and/or processes described above can be employed to analyze the input dataset 207 (e.g., the variables thereof) and/or to analyze a constraint input 209.

As a result of the aforementioned one or more operations, steps and/or processes, a formal form conversion is provided from the natural language form of the constraint input 209 and/or input dataset 207.

In response to provision of the formal form conversion, the augmentation component 214 can employ the formal form as input to output a mixed influence mapping 215 (also herein referred to as a mixed influence model). The influence mapping 215 can comprise one or more constraint variables generated by the augmentation component 214 and based on the constraint input 209 and/or input dataset 207. A constraint variable generally can represent a change to the optimization model 213. For example, a constraint variable can be a formula setting forth the constraint input 209.

Thus the influence mapping 215 can be supported by each of the constraint input 209 and input dataset 207. Likewise, in being a "mixed" mapping, the influence mapping 215 also can be based on the optimization model 213. Put another way, the "mixed" influence mapping 215 can be based on both initial knowledge (e.g., of the optimization model 213 and/or input dataset 207) and additional informal knowledge (e.g., of the constraint input 209).

In one embodiment, for each constraint $C_i$ in a set of formal constraints C, the scope of $C_i$ can be the variable upon which $C_i$ is defined, and a deterministic function (e.g., constraint variable) can be added to the influence mapping 215 that can map each configuration of variables in the scope of $C_i$ to 0 if $C_i$ is satisfied, to infinity if $C_i$ is violated (such as via a hard constraint), and/or a quantity therebetween. In one or more other embodiments, $C_i$ can be employed as a soft constraint, and a positive penalty can be employed where $C_i$ is violated.

Using the influence mapping 215, the inference engine 220 can expand the influence mapping 215 over a specified time horizon. The specified time horizon can be selectively determined by the user entity and/or by the augmented reasoning system 202, such as based on the input dataset 207. For example, a suitable time horizon can be 24 hours, one week or one month.

Further, the inference engine 220 can generate an output policy 221 in response to the constraint input 209 and which output policy 221 can be based on the constraint input 209. Such output policy 221 can maximize an expected one or more reward variables, such as of the input dataset 207.

In one or more embodiments, the inference engine 220 can comprise and/or employ an inference algorithm, such as for variable elimination, to compute the optimal output policy 221. In one case, each constraint factor $C_i$ can be treated as a deterministic probability function $F_i$ such that the value of $F_i$ can be 1 if $C_i$ is satisfied and 0 otherwise (e.g., if $C_i$ is not satisfied or is violated).

In addition to the aforedescribed single iteration use of the optimization model 213 and/or the augmented reasoning system 202, additional iterations can be employed, such as to obtain additional input data(s) and/or constraint input(s), such as in response to a user entity's observance of the output policy 221 based on the "initial" constraint input 209. For example, a user entity can determine that the constraint input 209 was not properly conveyed to the non-limiting system 200 and/or not fully analyzed by the non-limiting system 200. In another example, a user entity can determine that to achieve a desired output policy, and additional constraint input can be desired.

In any such case, the various components of the augmented reasoning system 202 can further augment the optimization model 213.

In one or more such cases, the influence mapping 215 can be employed as the input or "initial" model in place of the optimization model 213, with additional knowledge (e.g., from analysis of an additional constraint input) being "mixed" with the influence mapping 215.

In one or more embodiments, additional iterations can be continued in an interactive loop until a user entity is satisfied with the computed output policy. A graphical user interface can be employed to receive input from a user entity. A chat bot interface can be employed, such as to elicit a new or additional constraint in a natural language form.

An additional iteration can comprise further employing the analysis component 212, augmentation component 214 and inference engine 220 to ultimately deliver a revised output policy 221'.

Additionally, referring still to FIG. 2, the augmented reasoning system 202 can conduct a training, such as of the optimization model 213 and/or influence mapping 215 (i.e., mixed influence model) to further update based upon the NL text and formal form based on the constraint input 209. Training can be provided at any suitable frequency, such as in relation to each individual iteration of use of the augmented reasoning system 202 and/or as selectively determined, such as by a user entity.

In one or more embodiments, a new optimization model or other ML model can be trained based on the determined training data set (e.g., based upon the NL text and formal form based on the constraint input 209).

Figure 3:
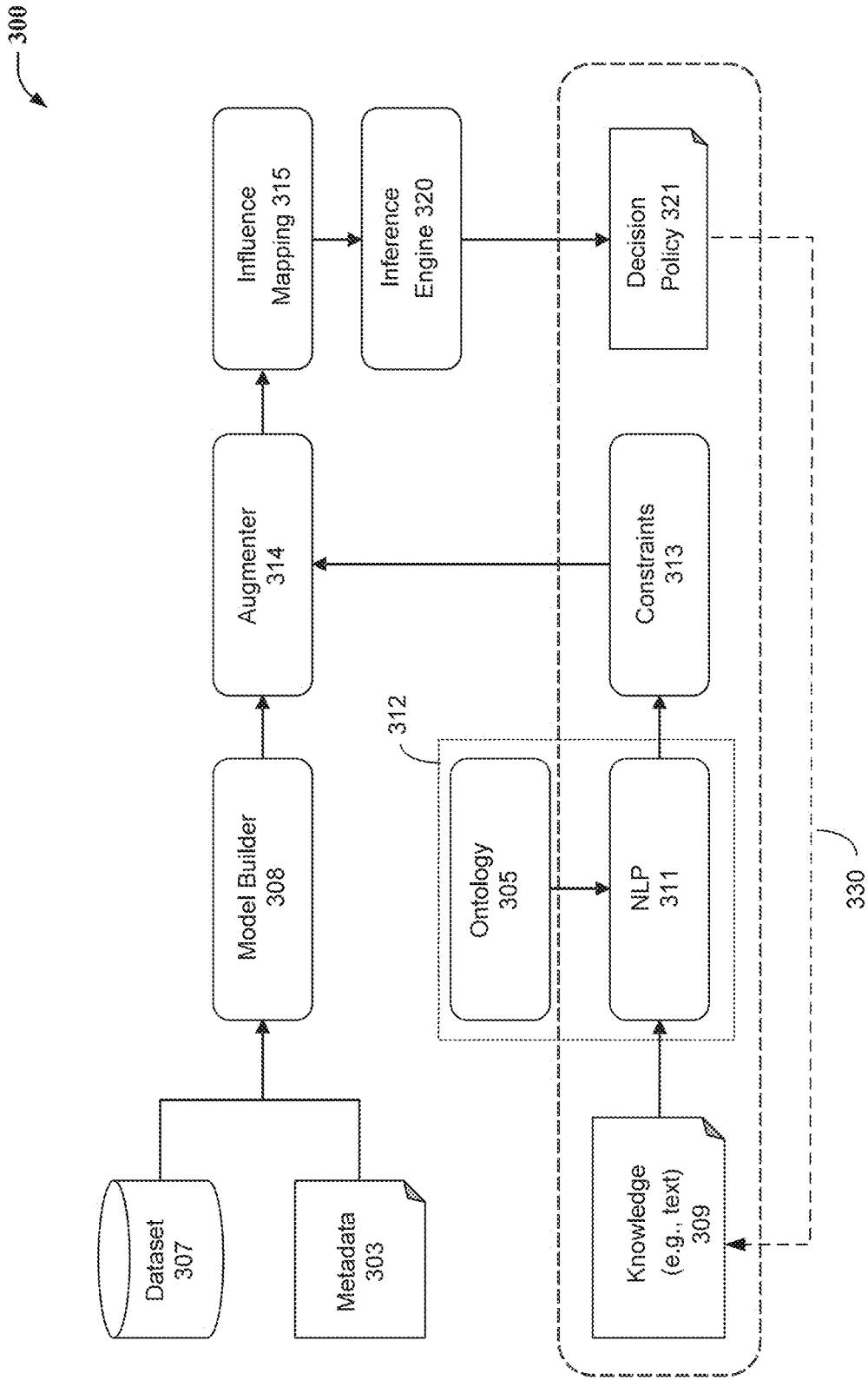
FIG. 3 illustrates a high-level schematic diagram of one or more operations that can be performed by the non-limiting system of FIG. 2, in accordance with one or more embodiments described herein.

Referring next to FIG. 3, illustrated is a process flow 300 that can facilitate provision of an influence mapping having a constraint variable corresponding to a natural language constraint input, and which can facilitate provision of an optimal output policy by employing the constraint variable. Description is provided in accordance with one or more embodiments described herein, such as the non-limiting 200 of FIG. 2. While the process flow 300 is described relative to the non-limiting system 200 of FIG. 2, the process flow 300 can be applicable also to other systems described herein, such as the non-limiting system 100 of FIG. 1. Repetitive description of like elements and/or processes employed in respective embodiments is omitted for sake of brevity.

At 308, a model builder (e.g., which can be similar to the model generation component 208) can employ a dataset 307 and metadata 303 to generate an optimization model (e.g., optimization model 213). At 314, an augmenter (e.g., which can be similar to the augmentation component 214) can employ the optimization model (e.g., optimization model 213) and formal constraints 313 in generating an output of an influence mapping 315 (e.g., which can be similar to the influence mapping 215). At 320, an inference engine (e.g., which can be similar to the inference engine 220) can employ the influence mapping 315 to output decision policy 321 (e.g., which can be similar to output policy 221).

At 312 (e.g., which can be similar to the analysis component 212), knowledge 309 (e.g., which can be similar to constraint input 209) can be employed to output the constraints 313 (e.g., formal constraints in a formal form). Box 312 can comprise an ontology component 305 and/or an NLP component 311.

In one or more embodiments, path 330 can be followed to complete an iterative loop to continue to elicit knowledge (e.g., in natural language) incrementally, such as until an optimal decision policy 321 is output. Optimal can be defined as meeting one or more subjective and/or objective criteria, such as selectively determined by a user entity.

Figure 4:
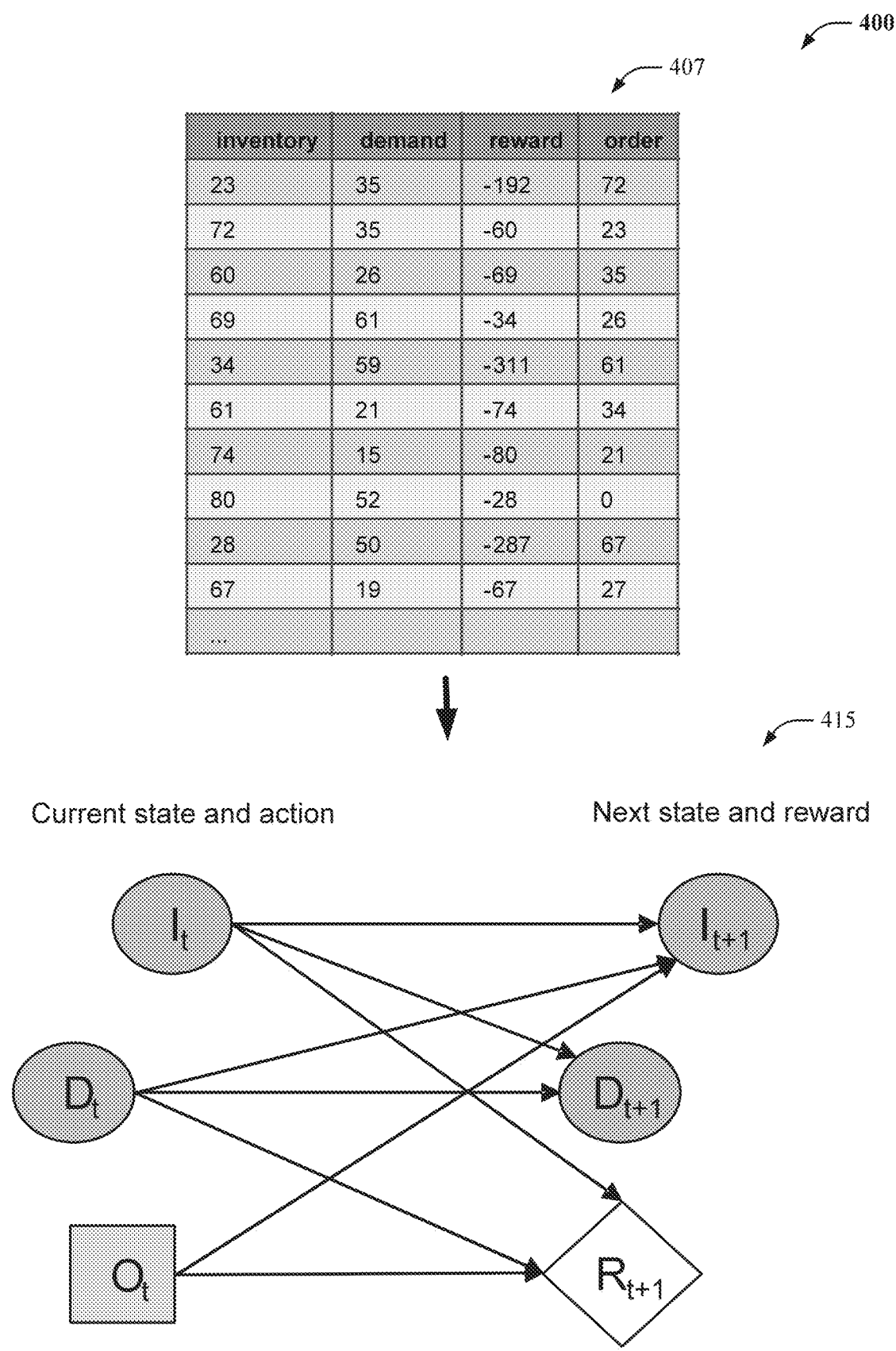
FIG. 4 illustrates a schematic diagram of an exemplary ML model generation, in accordance with one or more embodiments described herein.
Figure 5:
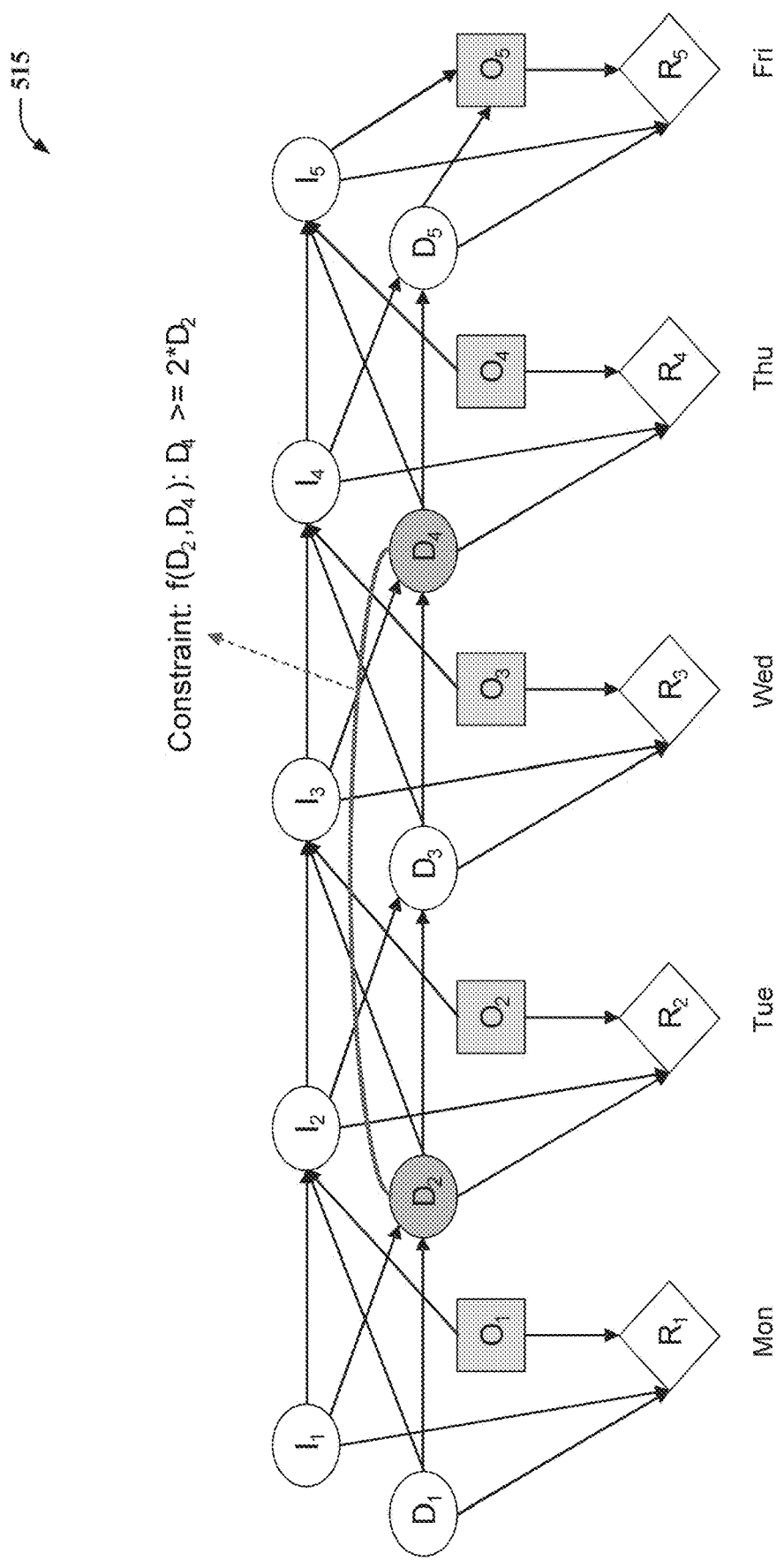
FIG. 5 illustrates a schematic representation of an unfolded influence mapping generated in connection with the ML model generation of FIG. 4, in accordance with one or more embodiments described herein.
Figure 6:
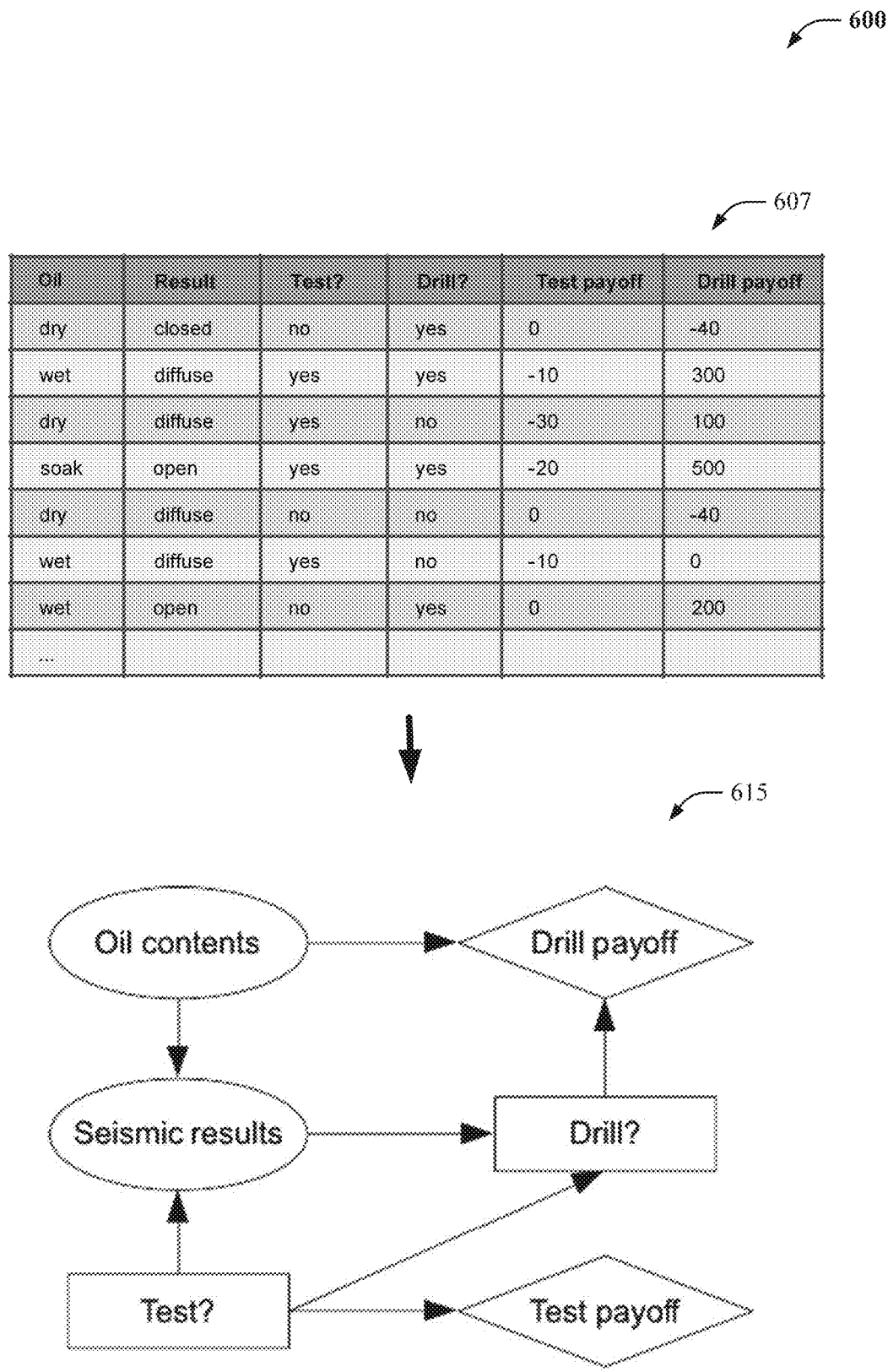
FIG. 6 illustrates a schematic diagram of another exemplary ML model generation, in accordance with one or more embodiments described herein.

Turning next to FIGS. 4 to 6, illustrated are two exemplary cases (e.g., FIGS. 4, 5 and FIG. 6) for use of the non-limiting system 200, and particularly for use of the augmented reasoning system 202.

For example, at FIG. 4, a schematic diagram 400 depicts an exemplary ML model generation 415 based on an input dataset 407, in accordance with one or more embodiments described herein. The example of FIG. 4 is based upon stock ordering for optimal input and output flow of stock.

In the example, a user entity can upload the input dataset 407, such as to the augmented reasoning system 202. The input dataset 407 can comprise sets of tuples comprising historical inventory, demand, negative cost (reward) and order quantity for a hypothetical stock item. Each row i can represent a current state $S_i$ (inventory and demand), the respective action $A_i$ (order) and respective reward $R_{i+1}$ that is received upon applying the action $A_i$. Row i+1 can represent a next state $S_{t+1}$ to which the system (e.g., augmented reasoning system 202) can transition to upon applying action $A_t$.

Subsequently, the system (e.g., augmented reasoning system 202) can learn an influence mapping 415. Relative to influence mapping 415, a joint distribution can be represented by $P(I_{t+1}, D_{t+1}, I_t, D_t, O_r)$, and a reward can be represented by $R_{t+1}(I_t, D_t, O_r)$. Assuming a daily time discretization (e.g., Mon, Tue, . . . , Fri), a user entity can interact with the system (e.g., via a conversational interface) and input extra (informal knowledge) such as: "Demand on Thursday is likely to be twice as big as on Tuesday".

Turning to FIG. 5, illustrated is a schematic representation of an unfolded influence mapping 515 generated in connection with the influence mapping generation of FIG. 4, in accordance with one or more embodiments described herein. The system (e.g., augmented reasoning system 202) can automatically unfold the dynamic influence mapping 415 over a time horizon (e.g., Mon-Fri) and can add the constraint $f(D_2, D_4): D_4 \geq 2*D_2$ (e.g., formal form of the provided NL constraint). The system can subsequently compute an optimal policy and can determine the optimal daily orders of the hypothetical stock item that can satisfy the constraint(s).

At FIG. 6, a schematic diagram 600 depicts an exemplary ML model generation 615 based on an input dataset 607, in accordance with one or more embodiments described herein. The example of FIG. 6 is based upon an oil drill scenario balancing cost of drilling versus possible output of oil.

That is, the augmented reasoning system 202 can accommodate static decision problems. For example, an oil company can desire to dig for oil. Before digging, the oil company can run a seismic test to get an idea of oil content underground. One or more results of the test can depend on the actual oil contents underground. Both the test and the digging decisions can be associated with rewards (e.g., negative costs of the associated operations, such as expressed in a monetary unit).

In the example, a user entity can upload the input dataset 507, such as to the augmented reasoning system 202. The input dataset 507 can comprise sets of tuples comprising oil contents, seismic test results, whether a test was run, whether or not to drill, test payoff (e.g., reward) and drill payoff (e.g., reward). Each row i can represent state variables (oil contents, seismic test results), decision/actions (whether to test, whether to drill) and rewards (test payoff and drill payoff).

Subsequently, the system (e.g., augmented reasoning system 202) can learn an influence mapping 515. A user entity can interact with the system (e.g., via a conversational interface) and input extra (informal knowledge) such as: "The global oil sales policy is likely to cause a 10% drop in oil price (drill payoff)".

The system (e.g., augmented reasoning system 202) can automatically unfold the dynamic influence mapping 515 over a time horizon and can add the constraint Drill_payoff=0.9*Drill_payoff (e.g., formal form of the provided NL constraint). The system can subsequently compute an optimal policy that can satisfy the constraint(s).

Figure 7:
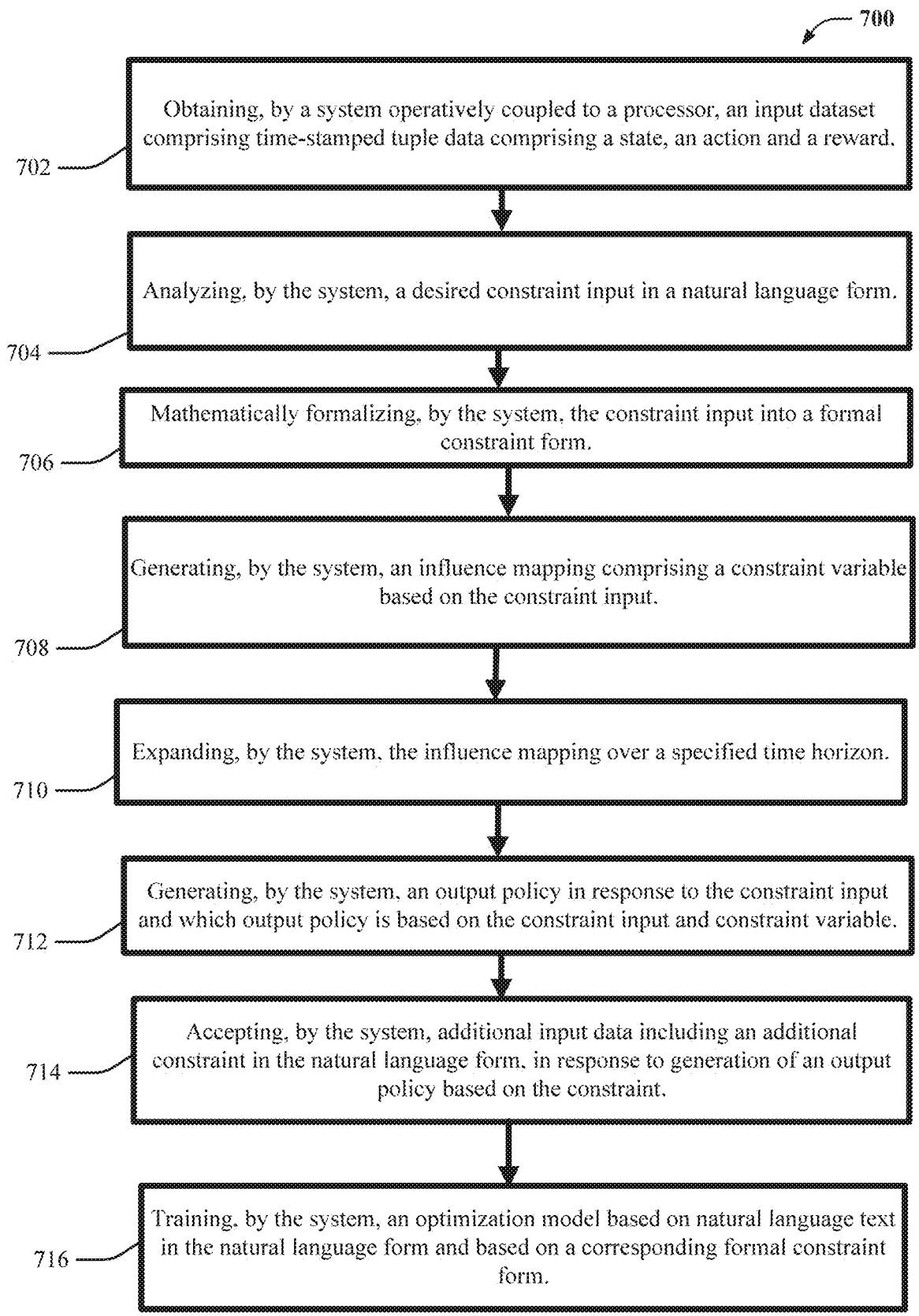
FIG. 7 illustrates a process flow for facilitating generation of a decision policy, in accordance with one or more embodiments described herein.

Next, FIG. 7 illustrates a flow diagram of an example, non-limiting method 700 that can facilitate generation of a decision policy, in accordance with one or more embodiments described herein, such as the non-limiting 200 of FIG. 2. While the non-limiting method 700 is described relative to the non-limiting system 200 of FIG. 2, the non-limiting method 700 can be applicable also to other systems described herein, such as the non-limiting system 100 of FIG. 1. Repetitive description of like elements and/or processes employed in respective embodiments is omitted for sake of brevity.

At 702, the non-limiting method 700 can comprise obtaining, by a system (e.g., determination component 210 of augmented reasoning system 202) operatively coupled to a processor, an input dataset (e.g., input dataset 207) comprising time-stamped tuple data comprising a state, an action and a reward.

At 704, the non-limiting method 700 can comprise analyzing, by the system (e.g., analysis component 212 of augmented reasoning system 202), a desired constraint input (e.g., constraint input 209) in a natural language form.

At 706, the non-limiting method 700 can comprise mathematically formalizing, by the system (e.g., analysis component 212 of augmented reasoning system 202), the constraint input (e.g., constraint input 209) into a formal constraint form.

At 708, the non-limiting method 700 can comprise generating, by the system (e.g., augmentation component 214 of augmented reasoning system 202), an influence mapping (e.g., influence mapping 215) comprising a constraint variable based on the constraint input (e.g., constraint input 209).

At 710, the non-limiting method 700 can comprise expanding, by the system (e.g., augmentation component 214 of augmented reasoning system 202), the influence mapping (e.g., influence mapping 215) over a specified time horizon.

At 712, the non-limiting method 700 can comprise generating, by the system (e.g., inference engine 220 of augmented reasoning system 202), an output policy (e.g., output policy 221) in response to the constraint input (e.g., constraint input 209) and which output policy is based on the constraint input (e.g., constraint input 209) and constraint variable.

At 714, the non-limiting method 700 can comprise accepting, by the system (e.g., determination component 210 of augmented reasoning system 202), additional input data including an additional constraint input in the natural language form, in response to generation of an output policy (e.g., output policy 221) based on the constraint input (e.g., constraint input 209).

At 716, the non-limiting method 700 can comprise training, by the system (e.g., training component 220 of augmented reasoning system 202), an optimization model (e.g., optimization model 213) on natural language text in the natural language form and based on a corresponding formal constraint form.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, devices, computer program products and/or computer-implemented methods of use provided herein relate to outputting an optimal decision policy base on informal knowledge input. A system can comprise a memory that stores computer executable components, and a processor that executes the computer executable components stored in the memory, wherein the computer executable components can comprise an analysis component that analyzes an input dataset comprising a constraint in a natural language form, and an augmentation component that generates an influence mapping comprising a constraint variable based on the constraint input. In an embodiment, an input dataset employed to support the influence mapping can comprise time-stamped tuple data comprising a state, an action and a reward. In an embodiment, an inference engine can generate an output policy in response to the constraint input and which output policy can be based on the constraint input and constraint variable.

An advantage of the aforementioned systems, computer-implemented methods and/or computer program products can be generation of a decision policy from input data, such that the decision policy satisfies a desired constraint input provided in an informal manner. In this way, where it can be difficult to express formally (e.g., relative to formalism(s) of an ML model) a constraint and/or preference, such constraint and/or preference instead can be input in an informal manner, such as in a natural language form.

Another advantage can be provision of an alternative to building a new optimization model, and/or reconstructing an optimization model, each time input data changes, an optimization model instead can be augmented via conversion of a natural language constraint to a mathematical formal form. The formal form can be employed to generate a constraint variable, where the constraint variable can be applied to an unfolded influence mapping (e.g., relative to the optimization model). The influence mapping can be analyzed by an inference engine to output a decision policy that can satisfy the constraint absent rebuilding the optimization model and/or re-training the optimization model on new data.

That is, adding extra knowledge to a system in an informal manner can be made efficient, automatic, cost-effective and/or more accurate than with existing technologies and/or approaches, such as by leveraging NLP. Indeed, in view of the one or more embodiments described herein, a practical application of the systems, computer-implemented methods and/or computer program products described herein can be generating/training models that can produce more accurate forecasting, even in the presence of ever-changing and/or unpredicted underlying variables (e.g., input data). Overall, such computerized tools can constitute a concrete and tangible technical improvement in the field of artificial intelligence forecasting and/or machine learning or active learning forecasting.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to model forecasting and/or predictions, as compared to existing systems and/or techniques. Systems, computer-implemented methods and/or computer program products facilitating performance of these processes are of great utility in the field of active computer-based learning and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively train a computerized model (e.g., AI model, ML model and/or DL model) and/or convert natural language to a mathematical formula to a constraint variable as the one or more embodiments described herein can facilitate this process. And, neither can the human mind nor a human with pen and paper electronically effectively train a computerized model (e.g., AI model, ML model and/or DL model) and/or convert natural language to a mathematical formula to a constraint variable, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

Figure 8:
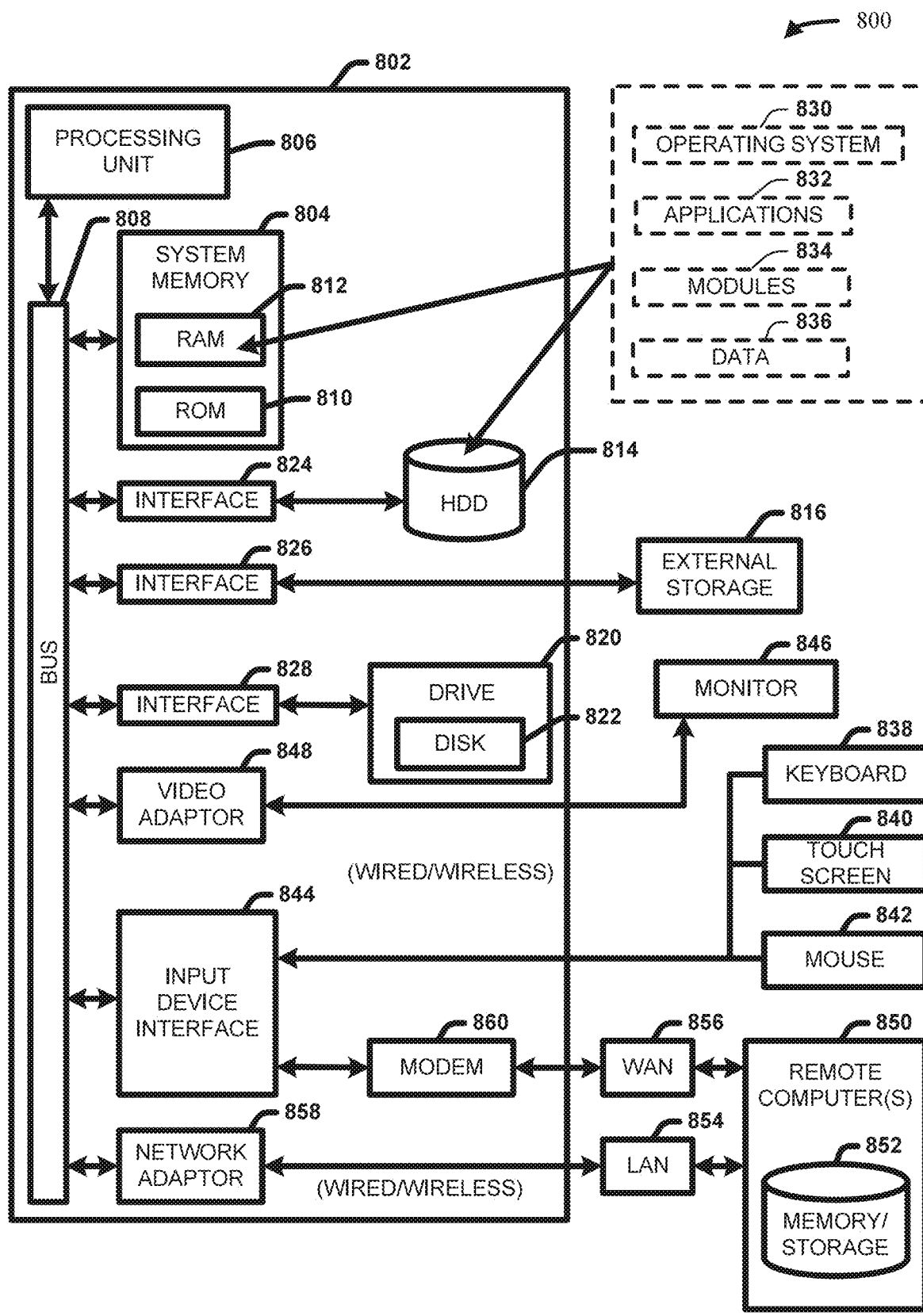
FIG. 8 illustrates a block diagram of an example, non-limiting, operating environment in which one or more embodiments described herein can be facilitated.
Figure 9:
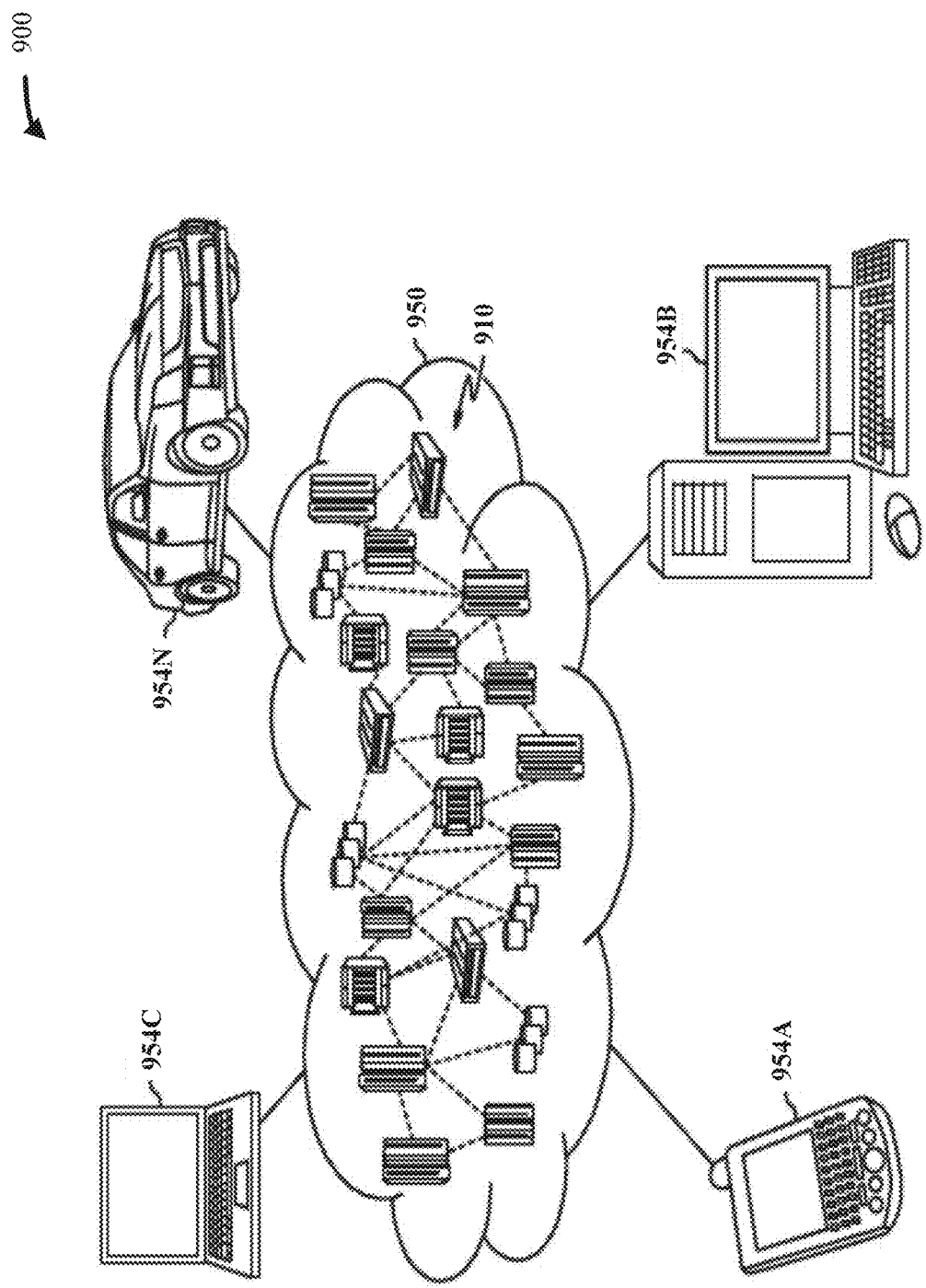
FIG. 9 illustrates a block diagram of an example, non-limiting, cloud computing environment in accordance with one or more embodiments described herein.
Figure 10:
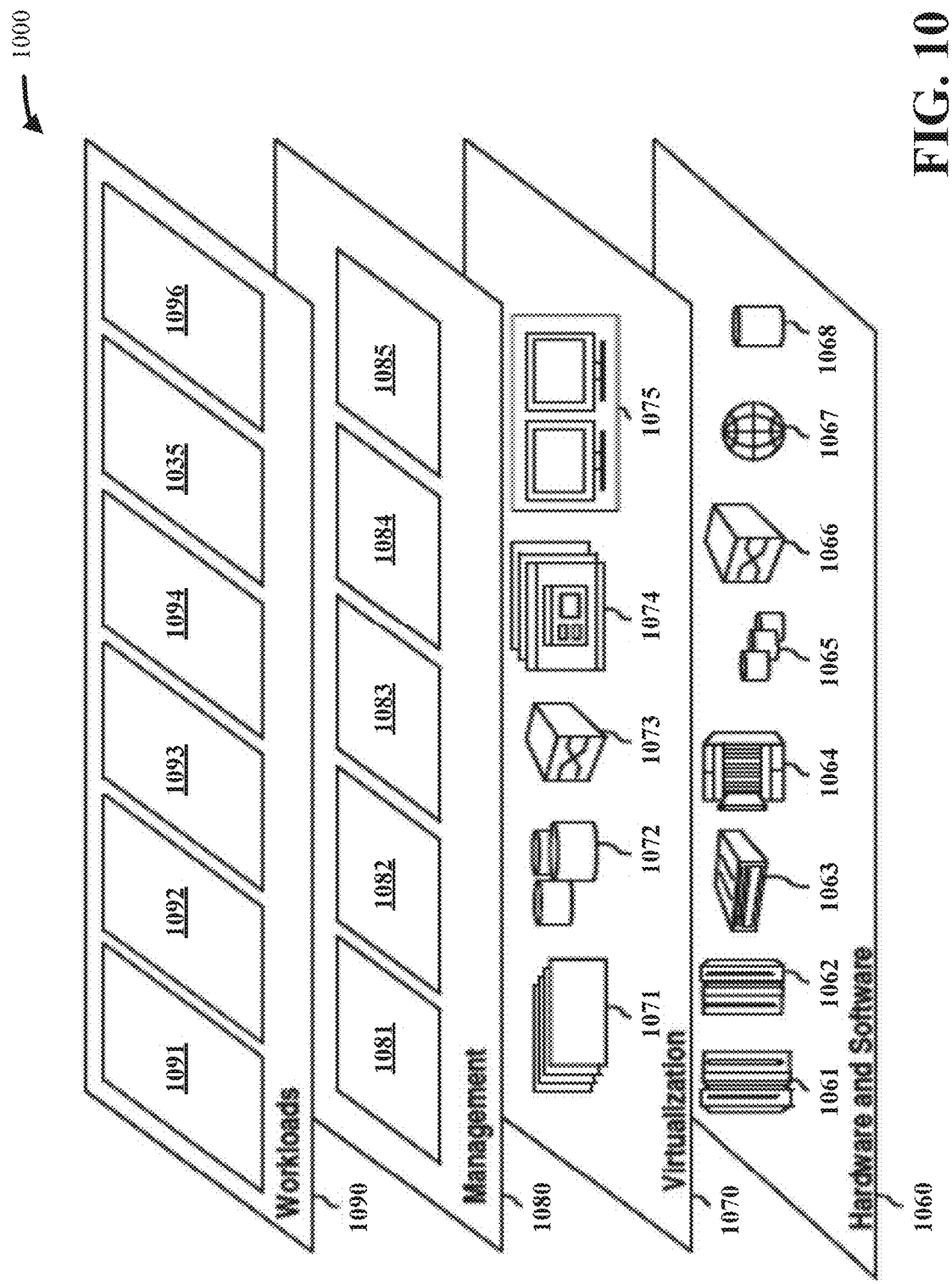
FIG. 10 illustrates a block diagram of example, non-limiting, abstraction model layers in accordance with one or more embodiments described herein.

Turning next to FIGS. 8-10, a detailed description is provided of additional context for the one or more embodiments described herein at FIGS. 1-7.

FIG. 8 and the following discussion are intended to provide a brief, general description of a suitable operating environment 800 in which one or more embodiments described herein at FIGS. 1-7 can be implemented. For example, one or more components and/or other aspects of embodiments described herein can be implemented in or be associated with, such as accessible via, the operating environment 800. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared and/or other wireless media.

With reference still to FIG. 8, the example operating environment 800 for implementing one or more embodiments of the aspects described herein can include a computer 802, the computer 802 including a processing unit 806, a system memory 804 and/or a system bus 808. One or more aspects of the processing unit 806 can be applied to processors such as 106 and/or 206 of the non-limiting systems 100 and/or 200. The processing unit 806 can be implemented in combination with and/or alternatively to processors such as 106 and/or 206.

Memory 804 can store one or more computer and/or machine readable, writable and/or executable components and/or instructions that, when executed by processing unit 806 (e.g., a classical processor, a quantum processor and/or like processor), can facilitate performance of operations defined by the executable component(s) and/or instruction(s). For example, memory 804 can store computer and/or machine readable, writable and/or executable components and/or instructions that, when executed by processing unit 806, can facilitate execution of the one or more functions described herein relating to non-limiting system 100 and/or non-limiting system 200, as described herein with or without reference to the one or more figures of the one or more embodiments.

Memory 804 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 806 can comprise one or more types of processors and/or electronic circuitry (e.g., a classical processor, a quantum processor and/or like processor) that can implement one or more computer and/or machine readable, writable and/or executable components and/or instructions that can be stored at memory 804. For example, processing unit 806 can perform one or more operations that can be specified by computer and/or machine readable, writable and/or executable components and/or instructions including, but not limited to, logic, control, input/output (I/O), arithmetic and/or the like. In one or more embodiments, processing unit 806 can be any of one or more commercially available processors. In one or more embodiments, processing unit 806 can comprise one or more central processing unit, multi-core processor, microprocessor, dual microprocessors, microcontroller, System on a Chip (SOC), array processor, vector processor, quantum processor and/or another type of processor. The examples of processing unit 806 can be employed to implement one or more embodiments described herein.

The system bus 808 can couple system components including, but not limited to, the system memory 804 to the processing unit 806. The system bus 808 can comprise one or more types of bus structure that can further interconnect to a memory bus (with or without a memory controller), a peripheral bus and/or a local bus using one or more of a variety of commercially available bus architectures. The system memory 804 can include ROM 810 and/or RAM 812. A basic input/output system (BIOS) can be stored in a non-volatile memory such as ROM, erasable programmable read only memory (EPROM) and/or EEPROM, which BIOS contains the basic routines that help to transfer information among elements within the computer 802, such as during startup. The RAM 812 can include a high-speed RAM, such as static RAM for caching data.

The computer 802 can include an internal hard disk drive (HDD) 814 (e.g., EIDE, SATA), one or more external storage devices 816 (e.g., a magnetic floppy disk drive (FDD), a memory stick or flash drive reader, a memory card reader and/or the like) and/or a drive 820, e.g., such as a solid state drive or an optical disk drive, which can read or write from a disk 822, such as a CD-ROM disc, a DVD, a BD and/or the like. Additionally, and/or alternatively, where a solid state drive is involved, disk 822 could not be included, unless separate. While the internal HDD 814 is illustrated as located within the computer 802, the internal HDD 814 can also be configured for external use in a suitable chassis (not shown). Additionally, while not shown in operating environment 800, a solid state drive (SSD) can be used in addition to, or in place of, an HDD 814. The HDD 814, external storage device(s) 816 and drive 820 can be connected to the system bus 808 by an HDD interface 824, an external storage interface 826 and a drive interface 828, respectively. The HDD interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 812, including an operating system 830, one or more applications 832, other program modules 834 and/or program data 836. All or portions of the operating system, applications, modules and/or data can also be cached in the RAM 812. The systems and/or methods described herein can be implemented utilizing one or more commercially available operating systems and/or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In a related embodiment, operating system 830 can comprise one virtual machine (VM) of multiple VMs hosted at computer 802. Furthermore, operating system 830 can provide runtime environments, such as the JAVA runtime environment or the .NET framework, for applications 832. Runtime environments are consistent execution environments that can allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and/or settings for an application.

Further, computer 802 can be enabled with a security module, such as a trusted processing module (TPM). For instance, with a TPM, boot components hash next in time boot components and wait for a match of results to secured values before loading a next boot component. This process can take place at any layer in the code execution stack of computer 802, e.g., applied at application execution level and/or at operating system (OS) kernel level, thereby enabling security at any level of code execution.

An entity can enter and/or transmit commands and/or information into the computer 802 through one or more wired/wireless input devices, e.g., a keyboard 838, a touch screen 840 and/or a pointing device, such as a mouse 842. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 806 through an input device interface 844 that can be coupled to the system bus 808, but can be connected by other interfaces, such as a parallel port, an IEEE 1394 serial port, a game port, a USB port, an IR interface, a BLUETOOTH® interface and/or the like.

A monitor 846 or other type of display device can be alternatively and/or additionally connected to the system bus 808 via an interface, such as a video adapter 848. In addition to the monitor 846, a computer typically includes other peripheral output devices (not shown), such as speakers, printers and/or the like.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device and/or other common network node, and typically includes many or all of the elements described relative to the computer 802, although, for purposes of brevity, only a memory/storage device 852 is illustrated. Additionally, and/or alternatively, the computer 802 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 854 and/or larger networks, e.g., a wide area network (WAN) 856. LAN and WAN networking environments can be commonplace in offices and companies and can facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired and/or wireless communication to the LAN 854, which can also include a wireless access point (AP) disposed thereon for communicating with the adapter 858 in a wireless mode.

When used in a WAN networking environment, the computer 802 can include a modem 860 and/or can be connected to a communications server on the WAN 856 via other means for establishing communications over the WAN 856, such as by way of the Internet. The modem 860, which can be internal and/or external and a wired and/or wireless device, can be connected to the system bus 808 via the input device interface 844. In a networked environment, program modules depicted relative to the computer 802 or portions thereof can be stored in the remote memory/storage device 852. The network connections shown are merely exemplary and one or more other means of establishing a communications link among the computers can be used.

When used in either a LAN or WAN networking environment, the computer 802 can access cloud storage systems or other network-based storage systems in addition to, and/or in place of, external storage devices 816 as described above, such as but not limited to, a network virtual machine providing one or more aspects of storage and/or processing of information. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, such as with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 13, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1950 described below with reference to FIG. 9, and/or with reference to the one or more functional abstraction layers (e.g., quantum software and/or the like) described below with reference to FIG. 10, to execute one or more operations in accordance with one or more embodiments described herein. For example, cloud computing environment 950 and/or one or more of the functional abstraction layers 1060, 1070, 1080 and/or 1090 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and/or services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting system 100 and/or the example operating environment 800 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting system 100 and/or example operating environment 800 can be employed to use hardware and/or software to solve problems that are highly technical in nature, that are not abstract and/or that cannot be performed as a set of mental acts by a human.

Referring now to details of one or more aspects illustrated at FIG. 9, the illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C and/or automobile computer system 954N can communicate. Although not illustrated in FIG. 9, cloud computing nodes 910 can further comprise a quantum platform (e.g., quantum computer, quantum hardware, quantum software and/or the like) with which local computing devices used by cloud consumers can communicate. Cloud computing nodes 910 can communicate with one another. They can be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that cloud computing nodes 910 and cloud computing environment 950 can communicate with any type of computerized device over any type of network and/or network addressable connection (e.g., using a web browser).

Referring now to details of one or more aspects illustrated at FIG. 10, a set 1000 of functional abstraction layers is shown, such as provided by cloud computing environment 950 (FIG. 19). One or more embodiments described herein can be associated with, such as accessible via, one or more functional abstraction layers described below with reference to FIG. 10 (e.g., hardware and software layer 1060, virtualization layer 1070, management layer 1080 and/or workloads layer 1090). It should be understood in advance that the components, layers and/or functions shown in FIG. 10 are intended to be illustrative only and embodiments described herein are not limited thereto. As depicted, the following layers and/or corresponding functions are provided:

Hardware and software layer 1060 can include hardware and software components. Examples of hardware components include: mainframes 1061; RISC (Reduced Instruction Set Computer) architecture-based servers 1062; servers 1063; blade servers 1064; storage devices 1065; and/or networks and/or networking components 1066. In one or more embodiments, software components can include network application server software 1067, quantum platform routing software 1068; and/or quantum software (not illustrated in FIG. 10).

Virtualization layer 1070 can provide an abstraction layer from which the following examples of virtual entities can be provided: virtual servers 1071; virtual storage 1072; virtual networks 1073, including virtual private networks; virtual applications and/or operating systems 1074; and/or virtual clients 1075.

In one example, management layer 1080 can provide the functions described below. Resource provisioning 1081 can provide dynamic procurement of computing resources and other resources that can be utilized to perform tasks within the cloud computing environment. Metering and Pricing 1082 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1083 can provide access to the cloud computing environment for consumers and system administrators. Service level management 1084 can provide cloud computing resource allocation and/or management such that required service levels are met. Service Level Agreement (SLA) planning and fulfillment 1085 can provide pre-arrangement for, and procurement of, cloud computing resources for which a future requirement is anticipated in accordance with an SLA.

Workloads layer 1090 can provide examples of functionality for which the cloud computing environment can be utilized. Non-limiting examples of workloads and functions which can be provided from this layer include: mapping and navigation 1091; software development and lifecycle management 1092; virtual classroom education delivery 1093; data analytics processing 1094; transaction processing 1095; and/or application transformation software 1096.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
a memory that stores computer executable components; and
a processor that executes at least one of the computer executable components that:
trains, using a data structure comprising tuples, an optimization model to generate a decision policy for a problem, wherein the tuples respectively comprise a state variable, an action variable, and a reward variable;
analyzes a desired constraint input provided in a natural language form;
transforms the desired constraint input provided in the natural language form into a constraint based deterministic probability function;
generates an influence mapping based on the optimization model, the data structure comprising the tuples, and the constraint based deterministic probability function; and
retrains, using the influence mapping, the optimization model to generate an updated decision policy for the problem.

2. The system of claim 1, wherein an input dataset employed to support the influence mapping comprises time-stamped tuple data comprising a state, an action and a reward.

3. The system of claim 2, wherein the at least one of the computer executable components further:
expands the influence mapping over a specified time horizon.

4. The system of claim 3, wherein the at least one of the computer executable components further:
generates an output policy in response to the desired constraint input and which output policy is based on the input dataset and the constraint variable.

5. The system of claim 1, wherein the at least one of the computer executable components further:
accepts input data including an additional desired constraint input in the natural language form, in response to generation of an output policy based on the desired constraint input.

6. The system of claim 5, wherein the at least one of the computer executable components further:
transforms the additional desired constraint input provided in the natural language form into an additional constraint based deterministic probability function;
updates the influence mapping based on the optimization model, the data structure comprising the tuples, and the additional constraint based deterministic probability function; and
retrains, using the updated influence mapping, the optimization model to generate another updated decision policy for the problem.

7. The system of claim 1, wherein the at least one of the computer executable components further:
receives, via a chat bot interface, during a chat conversation with a user, the desired constraint input in the natural language form.

8. A computer-implemented method, comprising:
training, by a system operatively coupled to a processor, using a data structure comprising tuples, an optimization model to generate a decision policy for a problem, wherein the tuples respectively comprise a state variable, an action variable, and a reward variable;
analyzing, by the system, a desired constraint input provided in a natural language form;
transforming, by the system, the desired constraint input provided in the natural language form into a constraint based deterministic probability function;
generating, by the system, an influence mapping based on the optimization model, the data structure comprising the tuples, and the constraint based deterministic probability function; and retraining, by the system, using the influence mapping, the optimization model to generate an updated decision policy for the problem.

9. The computer-implemented method of claim 8, wherein an input dataset employed to support the influence mapping comprises time-stamped tuple data comprising a state, an action and a reward.

10. The computer-implemented method of claim 9, further comprising:
generating, by the system, an output policy in response to the desired constraint input and which output policy is based on the input dataset and the constraint variable.

11. The computer-implemented method of claim 8, further comprising:
expanding, by the system, the influence mapping over a specified time horizon.

12. The computer-implemented method of claim 8, further comprising:
accepting, by the system, input data including an additional desired constraint input in the natural language form, in response to generation of an output policy based on the desired constraint input.

13. The computer-implemented method of claim 12, further comprising:
transforming, by the system, the additional desired constraint input provided in the natural language form into an additional constraint based deterministic probability function;
updating, by the system, the influence mapping based on the optimization model, the data structure comprising the tuples, and the additional constraint based deterministic probability function; and
retraining, by the system, using the updated influence mapping, the optimization model to generate another updated decision policy for the problem.

14. The computer-implemented method of claim 8, further comprising:
receiving, by the system, via a chat bot interface, during a chat conversation with a user, the desired constraint input in the natural language form.

15. A computer program product facilitating a process to generate a decision policy, the computer program product comprising a computer readable storage medium having program instructions embodied therewith, the program instructions executable by a processor to cause the processor to:
train, by the processor, using a data structure comprising tuples, an optimization model to generate the decision policy for a problem, wherein the tuples respectively comprise a state variable, an action variable, and a reward variable;
transform, by the processor, the desired constraint input provided in the natural language form into a constraint based deterministic probability function;
analyze, by the processor, a desired constraint input provided in a natural language form;
generate, by the processor, an influence mapping based on the optimization model, the data structure comprising the tuples, and the constraint based deterministic probability function; and
retrain, by the processor, using the influence mapping, the optimization model to generate an updated decision policy for the problem.

16. The computer program product of claim 15, wherein an input dataset employed to support the influence mapping comprises time-stamped tuple data comprising a state, an action and a reward.

17. The computer program product of claim 16, wherein the program instructions are further executable by the processor to cause the processor to:
generate, by the processor, an output policy in response to the desired constraint input and which output policy is based on the input dataset and the constraint variable.

18. The computer program product of claim 15, wherein the program instructions are further executable by the processor to cause the processor to:
expand, by the processor, the influence mapping over a specified time horizon.

19. The computer program product of claim 15, wherein the program instructions are further executable by the processor to cause the processor to:
accept, by the processor, via a chat bot interface during a chat conversation with a user, input data including an additional desired constraint input in the natural language form, in response to generation of an output policy based on the desired constraint input.

20. The computer program product of claim 19, wherein the program instructions are further executable by the processor to cause the processor to:
transform, by the processor, the additional desired constraint input provided in the natural language form into an additional constraint based deterministic probability function;
update, by the processor, the influence mapping based on the optimization model, the data structure comprising the tuples, and the additional constraint based deterministic probability function; and
retrain, by the processor, using the updated influence mapping, the optimization model to generate another updated decision policy for the problem.

* * * * *